(12) United States Patent
Makkinejad

(10) Patent No.: US 11,961,154 B2
(45) Date of Patent: Apr. 16, 2024

(54) CONTRACT TOKEN INCLUDING SENSOR DATA

(71) Applicant: ENT. SERVICES DEVELOPMENT CORPORATION LP, Houston, TX (US)

(72) Inventor: Babak Makkinejad, Troy, MI (US)

(73) Assignee: DXC TECHNOLOGY SERVICES LLC, Ashburn, VA (US)

( * ) Notice: Subject to any disclaimer, the term of this patent is extended or adjusted under 35 U.S.C. 154(b) by 783 days.

(21) Appl. No.: 15/575,794

(22) PCT Filed: May 21, 2015

(86) PCT No.: PCT/US2015/032083
§ 371 (c)(1),
(2) Date: Nov. 20, 2017

(87) PCT Pub. No.: WO2016/186678
PCT Pub. Date: Nov. 24, 2016

(65) Prior Publication Data
US 2018/0144422 A1 May 24, 2018

(51) Int. Cl.
*G06Q 50/18* (2012.01)
*G06F 21/32* (2013.01)
(Continued)

(52) U.S. Cl.
CPC .......... *G06Q 50/188* (2013.01); *G06F 21/32* (2013.01); *G06Q 20/40145* (2013.01); *G09C 1/00* (2013.01); *H04L 9/30* (2013.01); *H04L 9/3213* (2013.01); *H04L 9/3228* (2013.01); *H04L 9/3231* (2013.01); *H04L 9/3234* (2013.01); *H04L 9/3247* (2013.01); *H04L 63/0861* (2013.01); *H04L 63/107* (2013.01); *H04W 12/06* (2013.01)

(58) Field of Classification Search
CPC ............ G06Q 50/188; G06Q 20/40145; G06F 21/32; H04L 9/30; H04L 9/3213; H04L 9/3231; H04L 9/3247; H04L 63/0861; H04W 12/06
See application file for complete search history.

(56) References Cited

U.S. PATENT DOCUMENTS

| | | | | |
|---|---|---|---|---|
| 5,794,207 A | * | 8/1998 | Walker .................. | G06Q 10/02 705/77 |
| 6,240,396 B1 | * | 5/2001 | Walker .................. | G06Q 10/02 705/13 |

(Continued)

OTHER PUBLICATIONS

European Patent Application No. 15892779.8, Search Report dated Dec. 11, 2018.

(Continued)

*Primary Examiner* — Steven S Kim
(74) *Attorney, Agent, or Firm* — Polsinelli PC

(57) ABSTRACT

In some examples, an electronic device includes sensor circuitry and token circuitry. The sensor circuitry may capture sensor data and the contract token circuitry may generate a contract acceptance token including an acceptance indication and sensor data captured by the sensor circuitry. The token circuitry may send the contract acceptance token including the sensor data to a different electronic device.

20 Claims, 7 Drawing Sheets

(51) Int. Cl.
*G06Q 20/40* (2012.01)
*G09C 1/00* (2006.01)
*H04L 9/30* (2006.01)
*H04L 9/32* (2006.01)
*H04L 9/40* (2022.01)
*H04W 12/06* (2021.01)

(56) References Cited

U.S. PATENT DOCUMENTS

| | | | | |
|---|---|---|---|---|
| 2002/0010857 A1* | 1/2002 | Karthik | ............... | G06Q 20/3674 713/168 |
| 2002/0062322 A1* | 5/2002 | Genghini | ............... | G06Q 30/06 715/234 |
| 2002/0147607 A1* | 10/2002 | Thakur | ................. | G06Q 10/10 705/311 |
| 2003/0177361 A1* | 9/2003 | Wheeler | ................ | G06Q 20/00 713/176 |
| 2006/0018484 A1* | 1/2006 | Yoshihiro | ........... | G06F 21/6218 380/277 |
| 2008/0052519 A1* | 2/2008 | Lee | ....................... | G06Q 10/10 713/176 |
| 2008/0141033 A1* | 6/2008 | Ginter | .................... | G06Q 10/10 713/175 |
| 2008/0289020 A1 | 11/2008 | Cameron | | |
| 2009/0069040 A1* | 3/2009 | Wiesmuller | ........... | G06Q 20/04 455/466 |
| 2009/0077386 A1* | 3/2009 | Simonian | ............. | H04L 9/3231 713/176 |
| 2009/0083064 A1* | 3/2009 | Mahinda | ............... | G06Q 30/00 705/2 |
| 2009/0117883 A1 | 5/2009 | Coffing | | |
| 2009/0298491 A1* | 12/2009 | Kadaba | ................. | G06Q 10/10 455/419 |
| 2011/0191232 A1* | 8/2011 | Macri Lassus | ........ | G06Q 30/08 705/37 |
| 2011/0270751 A1* | 11/2011 | Csinger | ................... | G06F 21/40 705/42 |
| 2012/0110681 A1* | 5/2012 | Kwong | ................. | H04W 4/185 726/30 |
| 2012/0198570 A1* | 8/2012 | Joa | ....................... | G06F 21/6218 726/30 |
| 2014/0025583 A1 | 1/2014 | McNeal | | |
| 2014/0108054 A1* | 4/2014 | Udani | .................... | G16H 10/20 705/3 |
| 2014/0289116 A1 | 9/2014 | Polivanyi | | |
| 2015/0006474 A1* | 1/2015 | Halder | .................... | G06F 16/93 707/608 |
| 2015/0026057 A1 | 1/2015 | Calman | | |
| 2015/0112774 A1 | 4/2015 | Georgoff | | |
| 2015/0112778 A1* | 4/2015 | Feldman | ............ | G06Q 30/0269 705/14.16 |
| 2015/0213404 A1* | 7/2015 | Follis | .................. | G06F 21/6209 705/317 |
| 2015/0269692 A1* | 9/2015 | Ryan | ....................... | G06Q 10/00 705/311 |

OTHER PUBLICATIONS

International Application No. PCT/US2015/032083, International Search Report and Written Opinion dated Sep. 4, 2015.

* cited by examiner

CONTRACT TOKEN INCLUDING SENSOR DATA

CROSS-REFERENCE TO RELATED APPLICATIONS

This application is a national stage application pursuant to 35 U.S.C. § 371 of International Application No. PCT/US2015/032083, filed May 21, 2015, the disclosure of which is hereby incorporated by reference herein.

BACKGROUND

Electronic devices are widely used in nearly every facet of society today. Advances in computing ability, increases in power-efficiency, and cost decreases have contributed to the widespread distribution and use of electronic devices in homes, travel, schools, businesses, entertainment, commerce, and countless other arenas of society. Increasing the capability of electronic devices may result in even greater use of electronic devices in the future.

BRIEF DESCRIPTION OF THE DRAWINGS

Certain examples are described in the following detailed description and in reference to the drawings.

DETAILED DESCRIPTION

The discussion above may provide devices, systems, logic, circuitry, and methods for the exchange of contract tokens including sensor data by electronic devices. The features below may support efficient generation and exchange of data tokens effectuating or recording a transaction, contract, obligation, agreement, or common understanding between parties. Sensor data included in such tokens may record an environment characteristic surrounding the electronic device at the time of exchange, and may provide user verification or authenticity validation for generated tokens. As such, the features described herein may increase the efficiency and authenticity of contract token exchanges between electronic devices.

Figure 1:
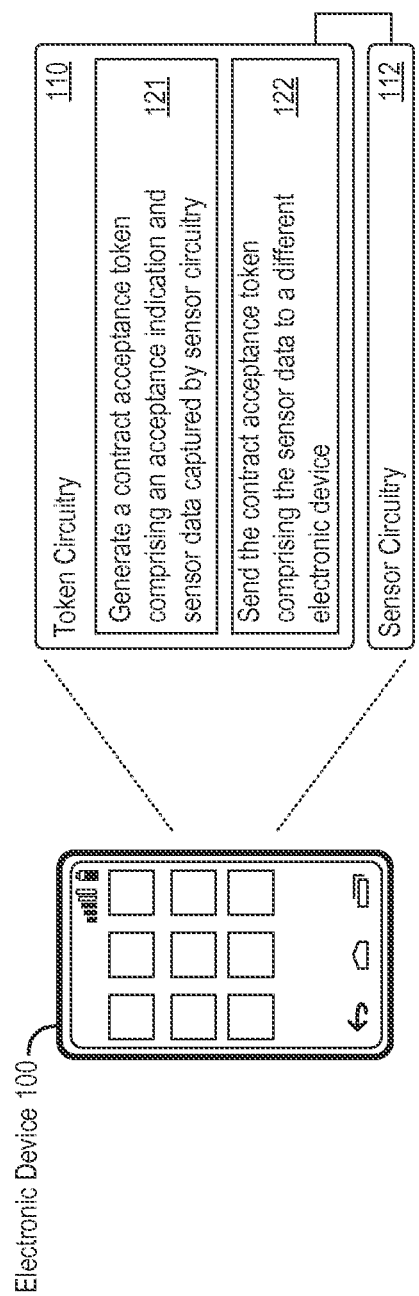
FIG. 1 shows an example of an electronic device that supports exchange of contract tokens including sensor data.

FIG. 1 shows an example of an electronic device 100 that supports exchange of contract tokens including sensor data. The electronic device 100 may take any number of forms. In the particular example shown in FIG. 1, the electronic device 100 takes the form of a mobile communication device, e.g., a mobile phone. Other example forms the electronic device 100 may take include a laptop or desktop computer, tablet device, personal digital assistant (PDA) device, portable music device, any wearable electronic device (such as a smartwatch device or an optical head-mounted display device), a token exchange device, and various other devices.

The electronic device 100 may include token circuitry 110. The token circuitry 110 may generate tokens, such as a contract token. Through a generated contract token, the electronic device 100 may log a transaction, contract, obligation, agreement, or understanding, e.g., as agreed upon by a user of the electronic device 100 and user of a different electronic device. The token circuitry 110 may generate the contract token as any data file storing elements relevant to a particular contract, agreement, or other understanding. Such elements may include, as examples, contract terms, a contract type, party indication (e.g., an offeror or offeree indicator), relevant date information (e.g., date offered, date accepted, validity period), and more. Example elements of a contract token are discussed in greater detail below.

The electronic device 100 may include sensor circuitry 112 to capture sensor data. The sensor circuitry 112 may capture sensor data, and thus include various types of circuitry to sense location data, image data, temperature, atmospheric pressure, user-specific traits, surrounding landmarks, or any other information pertaining to or obtained with respect to a surrounding physical environment. The token circuitry 110 may generate a contract token that includes sensor data. In particular, the token circuitry 110 may generate a contract token including sensor data specifically captured for inclusion in the contract token. By including sensor data with or as part of a contract token, the contract token may include data to verify the authenticity of the contract token, the electronic device or party providing the contract token, the location at which the contract token was generated, or combinations thereof.

The token circuitry 110 may generate tokens of various types. For example, the token circuitry 110 may generate a contract token including offer terms for a contract, which may be referred to as a contract offer token. In response to receiving a contract offer token and obtaining an acceptance indication (e.g., from a device user), the token circuitry 110 may generate a contract acceptance token. In the example shown in FIG. 1, the token circuitry 110 includes the sub-circuitry 121 and 122, which may be part of the token circuitry 110 as hardware, executable instructions stored on a machine-readable medium, logic, or as any other form the token circuitry 110 may take. Through the sub-circuitry 121 and 122, the token circuitry 110 may generate a contract acceptance token comprising an acceptance indication and sensor data captured by the sensor circuitry 112 as well as send the contract acceptance token comprising the sensor data to a different electronic device.

Figure 2:
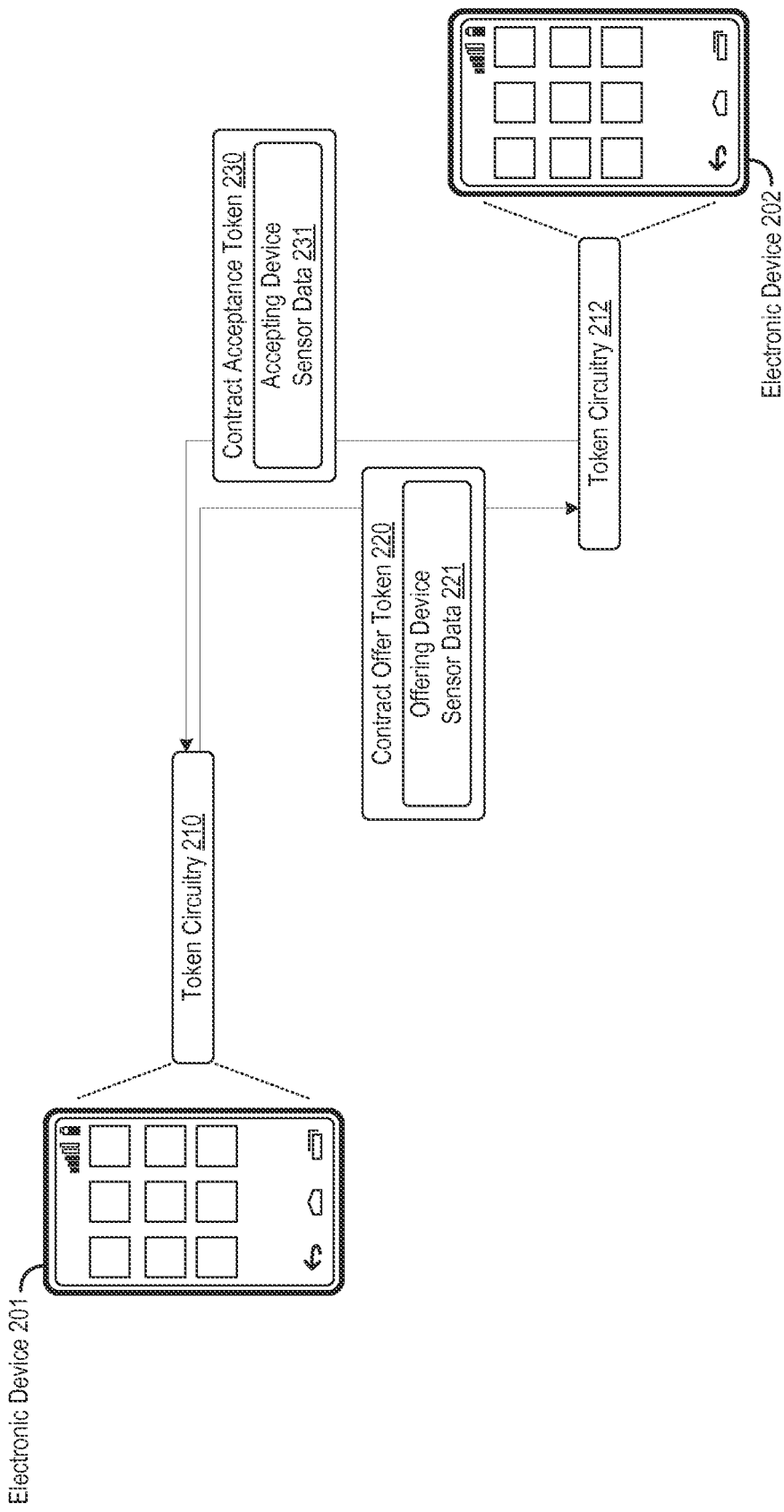
FIG. 2 shows an example of a contract token exchange between electronic devices.

FIG. 2 shows an example of a contract token exchange between electronic devices, in particular between the electronic devices labeled as 201 and 202 in FIG. 2. The electronic devices 201 and 202 may respectively include token circuitry to support the exchange of contract tokens including sensor data. In FIG. 2, the electronic device 201 includes the token circuitry 210 and the electronic device 202 includes the token circuitry 212. The electronic devices 201 and 202 may exchange one or multiple contract tokens to record an agreement between parties, such as an agreement reached by a user of the electronic device 201 and a user of the electronic device 202.

In the contract token exchange example shown in FIG. 2, the electronic device 201 may present a contract offer to the electronic device 202 in the form of a contract offer token. In doing so, the token circuitry 210 of the electronic device 201 may obtain offer terms for a contract. The contract offer terms may include any provision forming part of a contract, such as pricing information, action obligations, contract validity period, breach conditions, and more. To obtain the offer terms, the electronic device 201 may include a user interface through which the token circuitry 210 may request and receive offer terms. In some examples, the token circuitry 210 may present an input screen through which offer terms are input or support direct voice input of the contract terms by a user. The token circuitry 210 may generate a contract offer token that specifies the obtained offer term(s), and in FIG. 2, the token circuitry 210 generates the contract offer token labeled as 220.

The token circuitry 210 may include any number of token elements as part of the contract offer token 220. As noted above, the contract offer token 220 may include any number of contract offer terms. As another example of a token element, the contract offer token 220 may include sensor data. In particular, the contract offer token 220 may include sensor data collected by the device generating the contract offer token 220 (which is the electronic device 201 for the example shown in FIG. 2). As seen in FIG. 2, the token circuitry 210 includes offering device sensor data 221 with the contract offer token 220. The sensor data included as the offering device sensor data 221 may vary, and the token circuitry 210 may access specific types of sensor data to include with the contract offer token 220. The token circuitry 210 may include the specific sensor data as an authenticity indicator for the contract offer token 220, e.g., to validate the electronic device 202 or user thereof to a target electronic device receiving the contract offer token 220 or to validate the authenticity of the contract offer token 220 to confirm the authenticity or existence of a contract entered between the parties.

Some example types of sensor data that token circuitry may include in a token are presented next. In some examples, the token circuitry 210 accesses location data sensed by electronic device 201 to include in the contract offer token 220. The location data may take the form of global positioning system (GPS) data collected by GPS sensor circuitry of the electronic device 201, e.g., a GPS antenna. The token circuitry 210 may generate a contract token to include location coordinates (such as latitude and longitude coordinate data), altitude or elevation data, bearing, route data, nearby points of interest, or any other data indicative of a location of the electronic device 201. The location data may record a position of the electronic device 201 at which the contract offer token 220 was generated or sent, thus serving to track a particular user location upon presenting a contract offer or entering an agreement.

As another example of sensor data, the token circuitry 210 may include digital image data in the contract offer token 220. The electronic device 201 may include a digital camera or other image capture circuitry, and the token circuitry 210 may cause capture of a digital image to include within the contract offer token 220. For instance, the token circuitry 210 may cause capture of a user image through a front-facing camera of the electronic device 201, which may record or verify a particular user, person, agent, individual, or other entity presenting the offer terms specified in the contract offer token 220. The digital image may, as another example, depict the surroundings of the electronic device 201. An image of the device surroundings may verify or record a location of the electronic device 201, for example in combination with location data included with the contract offer token 220.

As more examples of sensor data, the token circuitry 210 may include accelerometer data or gyroscope data indicating an orientation of the electronic device 201. A proximity sensor (such as infrared circuitry) may capture proximity data for the electronic device 201, which the token circuitry 210 may include as part of the contract offer token 220. Barometer data tracking atmospheric pressure or temperature data indicating ambient temperature conditions are other examples of sensor data the token circuitry 210 may access to include in a generated token.

As yet another example of sensor data, the token circuitry 210 may access user-specific sensor data to include in the contract offer token 220. For instance, the token circuitry 210 may cause sensor circuitry of the electronic device 201 to capture a user heart rate via a heart rate monitor or a user finger print via a fingerprint sensor. When the electronic device 201 includes a pedometer, the token circuitry 210 may access pedometry data, such as a number of steps tracked by the electronic device 201 within a predetermined time period prior to generating or sending the contract offer token 220. These user-specific sensor data may indicate, authenticate, or confirm the user as the contract offeror the contract offer token 220.

Through any of the above examples of sensor data, the token circuitry 210 may record environment data with respect to the electronic device 201 when the contract offer token 220 is generated, allowing present or subsequent authenticity verification of the contract offer token 220. The specific types of sensor data included in a contract token may be configurable, e.g., through user request, adjusting token generation parameters referenced by the token circuitry 210, or in various other ways. The token circuitry 210 may access sensor data previously captured by the sensor circuitry and locally stored on the electronic device 201. Or, the token circuitry 210 may cause the sensor circuitry to capture sensor data as part of the token generation process. In some examples, the sensor circuitry of the electronic device 201 automatically captures sensor data in response to a token generation trigger, such as a user indication to generate a contract token.

Aside from sensor data, the token circuitry 210 may include various other elements within a contract token as well. For example, the token circuitry 210 may specify a contract type for the contract offer token 220. The contract type may denote a field or category with respect to the contract offer terms of contract formed through acceptance of the contract offer terms. As another example, the token circuitry 110 may include a date and time within the contract offer token 220, which may specify the date and time the contract offer token 220 was generated. For a contract offer token, the token circuitry 210 may include a token element indicating an offer validity period in the contract offer token 220, after which an offer specified through the contract offer token 220 expires. While some example token elements have been described, the token circuitry 210 may include any element that specifies any aspect of a contract, agreement, or understanding represented through the token.

A token element may differentiate a particular contract token from other contract tokens. In that regard, the token circuitry 210 may generate the contract offer token 220 to include an identification value, such as through a global unique identifier (GUID) according to any implementation of the universally unique identifier (QUID) standard. The token circuitry 210 may thus differentiate the contract offer token 220 from other contract tokens generated or received by the token circuitry 210. The identification value may likewise differentiate a particular token generated by an electronic device from other tokens also generated by the electronic device.

Upon generating the contract offer token 220, the token circuitry 210 may send the contract offer token 220 to a different electronic device. The different electronic device may be an electronic device of a user or entity to which the contract offers terms are offered to. In the example shown in FIG. 2, the token circuitry 210 sends the contract offer token 220 to the electronic device 202. The token circuitry 210 may send the contract offer token 220 through a direct connection between the electronic device 201 and the electronic device 202, such as through a direct wired connection (e.g., via a linking cable) or direct wireless connection (e.g., via a near field communication link, a Bluetooth link, or other forms of direct wireless links). In other examples, the token circuitry 210 utilizes an indirect data connection to send the contract offer token 220 to the electronic device 202.

Upon receiving of the contract offer token 220, token circuitry 212 of the electronic device 202 may process the contract offer token 220. The token circuitry 212 may extract particular elements of the contract offer token 220 to present, such as through a user interface of the electronic device 202. Through the user interface, the token circuitry 212 may present contract offer terms specified in the contract offer token 220, the offering device sensor data 221, other contract token elements, or combinations thereof. Also, the token circuitry 212 may present an acceptance prompt via the user interface, through which a user may indicate an acceptance or rejection of the contract offer terms. When the contract offer terms are accepted, the token circuitry 212 may obtain an acceptance indication through the acceptance prompt in the user interface.

The token circuitry 212 may generate a contract acceptance token that includes an acceptance indication for the contract offer terms specified in the contract offer token 220. In the example shown in FIG. 2, the token circuitry 212 generates the contract acceptance token 230. The contract acceptance token 230 may include sensor data captured by the electronic device 202, shown as the accepting device sensor data 231 in FIG. 2. For the contract acceptance token 230, the token circuitry 212 may include any number of types of sensor data to record or authenticate the contract acceptance indication, including any combination of the sensor data discussed above with respect to the contract offer token 220. The token circuitry 212 may include any number of other contract token elements discussed above as part of the contract acceptance token 230 as well. Then, token circuitry 212 may send the contract acceptance token 230 to the electronic device 201 as a response to the contract offer token 220.

In some examples, the token circuitry 212 obtains a rejection indication for the contract offer terms specified in the contract offer token 220. In these examples, the token circuitry 212 may generate and send a contract rejection token to the electronic device 201. In contrast to the contract acceptance token, the contract rejection token may instead include a rejection indication for contract offer terms, though the contract rejection token may nonetheless include any of the sensor data or other token elements discussed above. By including sensor data in a contract acceptance token or contract rejection token generated in response to the contract offer token 220, the token circuitry 212 may support present or subsequent authenticity validation of a response to the contact offer terms, which may resolve disputes over the validity or existence of a contract or offer rejection.

Electronic devices may exchange distinct contract tokens with one another. To illustrate, the contract offer token 220 generated by the token circuitry 210 of the electronic device 201 may be a distinct, separate data file from the contract acceptance token 230 generated by the token circuitry 212 of the electronic device 202. The contract offer token 220 and contract acceptance token 230 may include different GUIDs, for example, through which electronic devices may identify the tokens 220 and 230 as separate.

Token circuitry of an electronic device may pair correlated contract tokens. For instance, the token circuitry 210 may send the contract offer token 220 to the electronic device 202 as well as store the contract offer token 220 on a local memory of the electronic device 201 or at a remote storage location. Upon receiving a response to the contract offer token 220, the token circuitry 210 may pair the response with the contract offer token 220 to record the contract token exchange for subsequent reference. Thus, in the example shown in FIG. 2, the token circuitry 210 may pair the contract offer token 220 with the contract acceptance token 230 from the electronic device 202. When the electronic device 202 responds to the contract offer token 220 with a contract rejection token, the token circuitry 210 may pair the contract offer token 220 with the contract rejection token. To pair correlated contract tokens, the token circuitry 210 may store the correlated tokens in a common table entry, link the GUIDs of the correlated tokens, or add an entry to a pairing table mapping correlated tokens.

The token circuitry of an electronic device may secure a contract token to prevent tampering. To do so, the token circuitry may employ secure access mechanisms to limit access to token elements once a contract token is generated. The token circuitry may use any form of cryptography, public key infrastructure (PKI) mechanisms, digital signatures, or other access control technologies to prevent an unauthorized device or party from altering a contract token. In some examples, the token circuitry may secure a contract token upon generation. In other examples, the token circuitry may secure a contract token upon resolution, e.g., upon generation or reception of a contract acceptance token or a contract rejection token that responds to a contract offer token. In these examples, the token circuitry may secure the correlated token pair to prevent tampering after acceptance of a contract or rejection of contract offer terms.

As described above, token circuitry of an electronic device may support an exchange of contract tokens with other electronic devices. Doing so may provide an efficient and reliable mechanism to electronically record or effectuate an agreement between parties. Sensor data included within or accompanying a contract token may provide an authenticity indicator, to a different electronic device to which a contract token is sent or upon subsequent reference. While the above examples illustrate token exchange in the form of a contract token, the token circuitry 210 and 212 may provide token exchange capabilities for any type of agreement or promise. Token circuitry may include a set of predefined agreement or contract types that a user may select from when exchanging tokens through electronic devices. In some examples, the token circuitry may support generation and exchange of custom token types, e.g., with specific parameters, terms, or format different from the predefined types provided by the token circuitry.

As one example, the token circuitry of an electronic device may support exchange of contract tokens for non-financial contracts, promises, obligations, and agreements. Thus, the token circuitry may generate and exchange tokens recording barter exchanges or an agreement involving action without monetary terms. As another example, the token circuitry may support exchange of tokens for unilateral promises, actions, or agreements. In this example, the token circuitry 210 may generate and send a token to the electronic device 202 indicating a unilateral promise and the token circuitry 212 of the electronic device 202 may respond with an acknowledgment token. Thus, token exchange capabilities provided by the token circuitry may record or validate various types of transactions, agreements, and promises between parties. While many of illustrations presented herein relate to contract tokens, the token circuitry may consistently implement the features described above and below for token exchanges of any type.

Returning to the contract token exchange shown in FIG. 2, the electronic device 201 and the electronic device 202 may each store the contract offer token 220 and the contract acceptance token 230 after the exchange. Thus, either electronic device may support archiving and reference of the contract exchange for subsequent reference. In some examples, the electronic device 201, the electronic device 202, or both, may store paired contract tokens in a remote location, one example of which is shown in FIG. 3 through a token authority.

Figure 3:
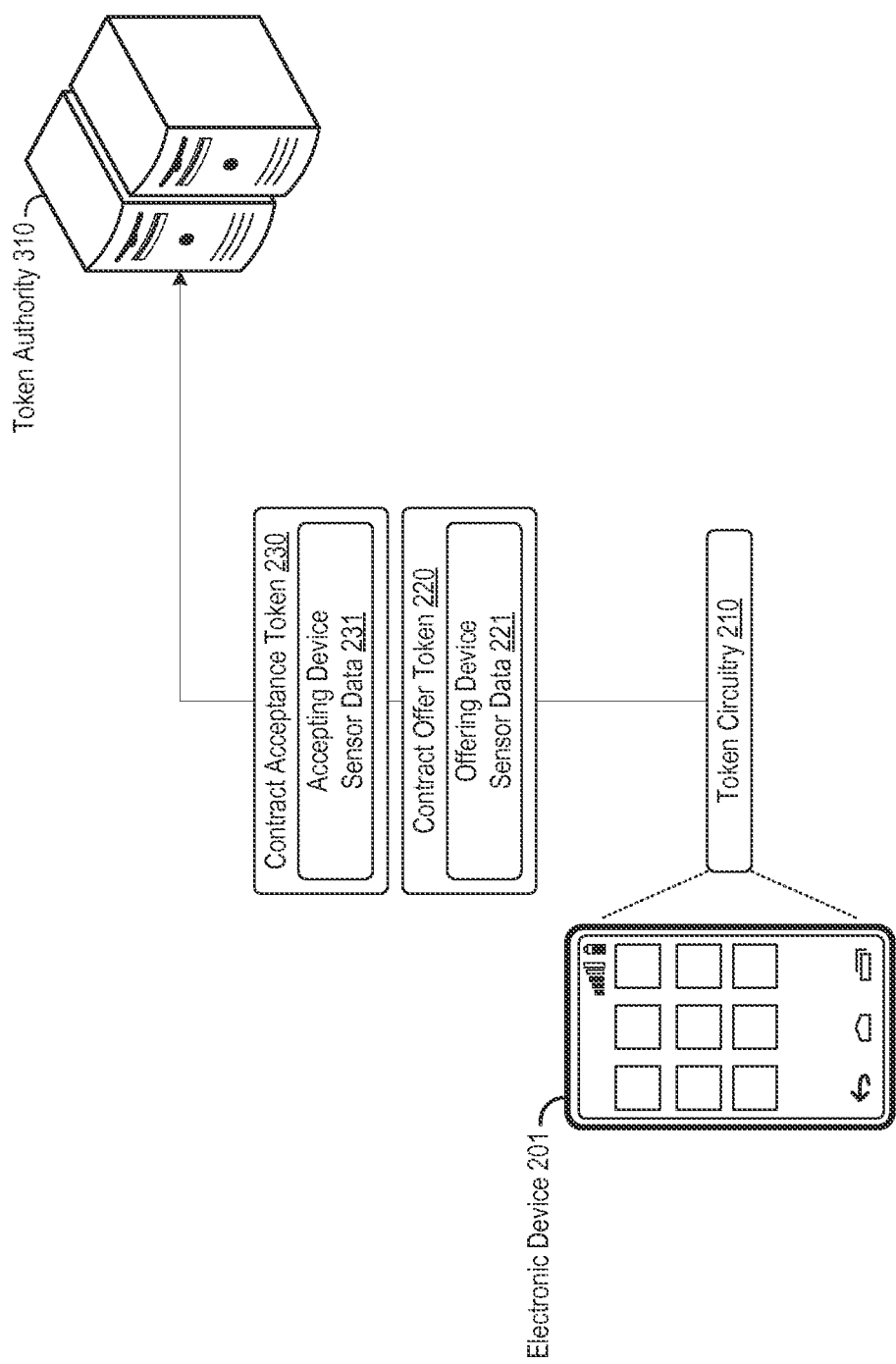
FIG. 3 shows an example of an electronic device storing contract tokens at a token authority.

FIG. 3 shows an example of an electronic device 201 storing contract tokens at a token authority 310. In particular, the token circuitry 210 may send a contract offer token 220 and a contract acceptance token 230 to the token authority 310 for archival. The token authority 310 may support subsequent retrieval of the correlated token pair by an electronic device that generated a token among the correlated contract tokens. Thus, for a token pairing of the contract offer token 220 and the contract acceptance token 230, the token authority 310 may grant access to the electronic device 201 (which generated the contract offer token 220) and the electronic device 202 (which generated the contract acceptance token 230).

The token authority 310 may be remote to the electronic device 201. Thus, the token authority 310 may provide non-local storage of contract tokens or correlated token pairs. The token authority 310 may take the form of any remote system accessible to the electronic device 201, such as a cloud server or a web server. The token authority 310 may include circuitry and logic to implement any of the token authority features described herein. In some examples, the token authority 310 authenticates the electronic device 201 prior to storing a token on behalf of the electronic device 201. The token authority 310 may implement any number of authentication techniques, such as verifying user login and password data provided by the token circuitry 210 of the electronic device 201.

The token authority 310 may support token exchanges between electronic devices. In some examples, the token authority 310 itself generates tokens to exchange between electronic devices. By doing so, the token authority 310 may provide a consistent format and common generation entity for tokens exchanged between electronic devices. In these examples, the token authority 310 may regulate token generation as well, for example by limiting token generation for a particular electronic device based on any number of token generation criteria. One illustration of a contract token exchange through the token authority 310 is provided through FIGS. 4 and 5.

Figure 4:
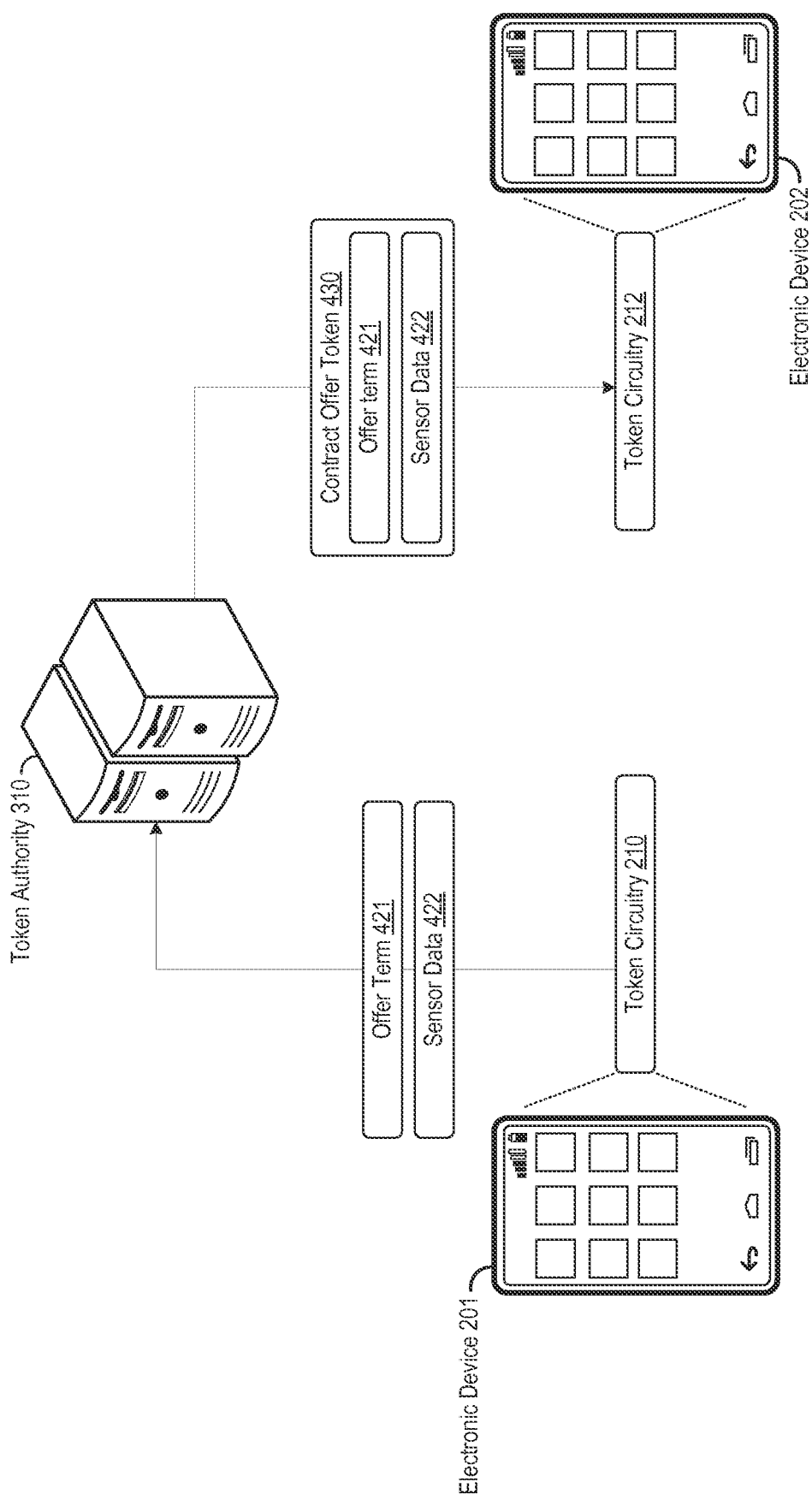
FIG. 4 shows an example of a contract token exchange between electronic devices through a token authority.

FIG. 4 shows an example of a contract token exchange between electronic devices through the token authority 310. In the example shown in FIG. 4, the electronic device 201 initiates a contract token exchange with the electronic device 202. To do so, the token circuitry 210 of the electronic device 201 obtains an offer term 421 and sensor data 422, for example according to any of the features discussed above. The token circuitry 210 may send the offer term 421 and the sensor data 422 to the token authority 310 for generation of a contract offer token that includes the offer term 421 and sensor data 422. The token circuitry 210 may also send a target device indication to the token authority 310, indicating the electronic device 202 as the target electronic device to receive the contract offer token generated by the token authority 310.

The token authority 310 may generate a contract offer token according to the offer term 421 and sensor data 422 received from the token circuitry 210 of the electronic device 201. In FIG. 4, the token authority 310 generates the contract offer token labeled as 430, which includes the offer term 421 and sensor data 422 provided by the electronic device 201. The token authority 310 may include any combination of the token dements discussed above within the contract offer token 430 as well, which the token authority 310 may obtain from the electronic device 201 (e.g., as provided by the token circuitry 210 with the offer term 421 and sensor data 422) or via other mechanisms. After generating the contract offer token 430, the token authority 310 may send the contract offer token 430 to the electronic device 202. The token authority 310 may archive the contract offer token 430 as well.

In some examples, the token authority 310 generates the contract offer token 430 upon determining that any number of token generation criteria are satisfied. The token generation criteria applied by the token authority 310 may be configurable, for example by a system administrator or user request. A token generation criterion may be particular to the electronic device 201, such as a criterion limiting the number of tokens the electronic device 201 can generate or receive to a threshold number (e.g., over a predetermined period of time). As another example, a token generation criterion may limit particular offer terms or token elements to upper or lower limits, e.g., an upper purchase price threshold, an upper limit on an offer validity period, or various other numerical limits. These limits may apply particularly to the electronic device 201, to a class of devices or user types, or for each token generated by the token authority 310.

In some implementations, the token authority 310 applies contract generation criteria to control the quality or type of sensor data provided by the electronic device 201. Thus, the token authority 310 may require a threshold image quality or image resolution for sensor data 422 in the form of a user image. The token generation criteria may specify specific sensor data types that the electronic device 201 should send in order to generate a contract offer token or a requisite capture time that the sensor data 422 must satisfy (e.g., captured within a recent time threshold such as within the previous 24 hours, within the last 2 minutes, or within the 10 seconds prior to sending to the token authority 310). When a token generation criterion applied by the token authority 310 is not satisfied, the token authority 310 may determine not to generate a contract offer token for the electronic device 201.

Figure 5:
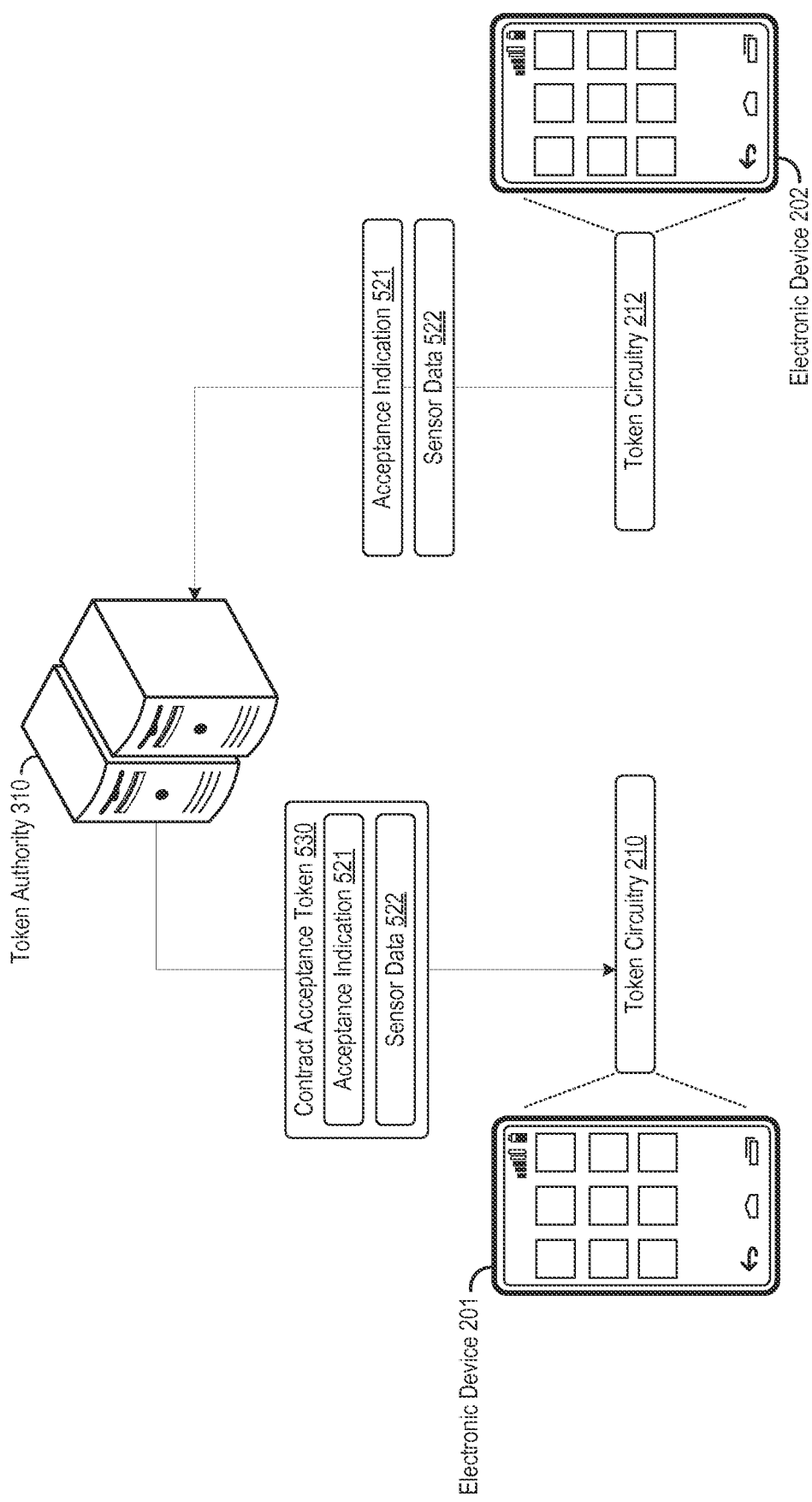
FIG. 5 shows another example of a contract token exchange between electronic devices through a token authority.

FIG. 5 shows another example of a contract token exchange between electronic devices through the token authority 310. In FIG. 5, the electronic device 202 may receive the contract offer token 430 from the token authority 310, and the token circuitry 212 of the electronic device 202 may respond with an acceptance indication 521 and sensor data 522 captured by the electronic device 202. The token circuitry 212 may send the acceptance indication 521 and the sensor data 522 to the token authority 310 for generating a contract acceptance token 530 that responds to the contract offer token 430.

Upon receiving the acceptance indication 521 and the sensor data 522, the token authority 310 may generate the contract acceptance token 530 and send the contract acceptance token 530 to the electronic device 201. The token authority 310 may apply token generation criteria for generating the contract acceptance token as well, including any combination of the criteria discussed above.

In the example shown in FIG. 5, the token authority 310 generates the contract acceptance token 530 to include both the acceptance indication 521 and the sensor data 522 captured by the electronic device 202. In other examples, the token authority 310 may generate a token to include selected portions of the sensor data provided by an electronic device. In these other examples, the token authority 310 may include some, but not all, of the sensor data 522 in the contract acceptance token 530. In some examples, the token authority 310 does not include any of the sensor data 522 in the contract acceptance token 530, though the token authority 310 may store the sensor data 522 for subsequent reference or token validation. The token authority 310 may flexibly vary the particular sensor data included in generated tokens according to system requirements for authenticity, efficiency, resource consumption, or various other factors.

In the examples shown in FIGS. 4 and 5, the token authority 310 may itself generate tokens according to token generation criteria. However, the token authority 310 may validate tokens generated by electronic devices. The token authority 310 may validate the content, form, or integrity of a generated token. To illustrate, an electronic device may send a generated token to the token authority 310 for validation, and prior to sending the token to a target electronic device. The token authority 310 may validate the token authority according to any number of token validation criteria, which may include any combination of the token generation criteria described above. The token authority 310 may determine whether contract terms are valid or within threshold parameters. The token authority 310 may confirm a generated token is generated according to a particular format, data type, or structure. Regarding integrity, the token authority 310 may verify that the token has not been tampered, e.g., by verifying the structural integrity of a generated token. For a custom token, the contract authority 310 may verify the integrity or format of the custom token, but not the content as the content may be user-specific. Thus, the token authority 310 may validate, limit, or control token exchanges between electronic devices even when the token authority 310 itself does not generate the tokens.

Upon determining a particular token passes token validation criteria applied by the token authority 310, the token authority 310 may provide a validation indication to the electronic device that generated the particular token. The token authority 310 may, for instance, embed the validation indication within the particular token itself by setting a particular field in the token, adding a digital signature for the token authority 310, or in any number of other ways. Then, the token authority 310 may return the particular token with the embedded validation indication to the electronic device that first generated the particular token. As other examples, the token authority 310 may provide the validation indication as a separate message to the electronic device indicating the particular token has been validated. Upon receiving the validation indication, the electronic device may then send the particular token to the target electronic device.

Figure 6:
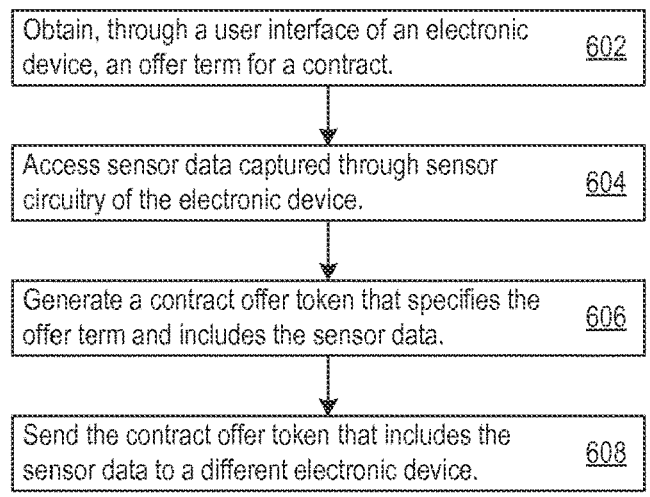
FIG. 6 shows an example of logic that an electronic device may implement to support exchange of contract tokens including sensor data.

FIG. 6 shows an example of logic 600 that an electronic device may implement to support exchange of contract tokens including sensor data. The electronic device may implement the logic 600 through token circuitry of the electronic device, for example as hardware, executable instructions stored on a machine-readable medium, or in various other ways. As such, the token circuitry of the electronic device may perform or execute the logic 600 as a method to support contract token exchange.

The token circuitry of the electronic device may obtain, through a user interface of the electronic device, an offer term for a contract (602). The token circuitry may also receive a token indication to send a contract offer token to a different electronic device, for example also through the user interface. To include with the contract offer token, the token circuitry may access sensor data captured through sensor circuitry of the electronic device (604). In some examples, the token circuitry instructs the sensor circuitry to capture the sensor data after receiving the token indication, including any of the sensor data examples provided above. The token circuitry may then generate a contract offer token that specifies the offer term and includes the sensor data (606) as well as send the contract offer token that includes the sensor data to a different electronic device (608).

In some examples, the token circuitry may further receive a contract acceptance token different from the contract offer token. The contract acceptance token and contract offer token may have different GUIDs for example. The token circuitry may pair the contract offer token with the contract acceptance token, thus linking the tokens as part of a common exchange or transaction. The token circuitry may store the contract offer token, the contract acceptance token, or both at a token authority. Prior to sending the contract offer token to the different electronic device, the token circuitry may validate the contract offer token with a token authority. The token authority may apply any number of criteria to determine whether to validate the generated contract offer token, including any of the token validation or token generation criteria presented above.

Figure 7:
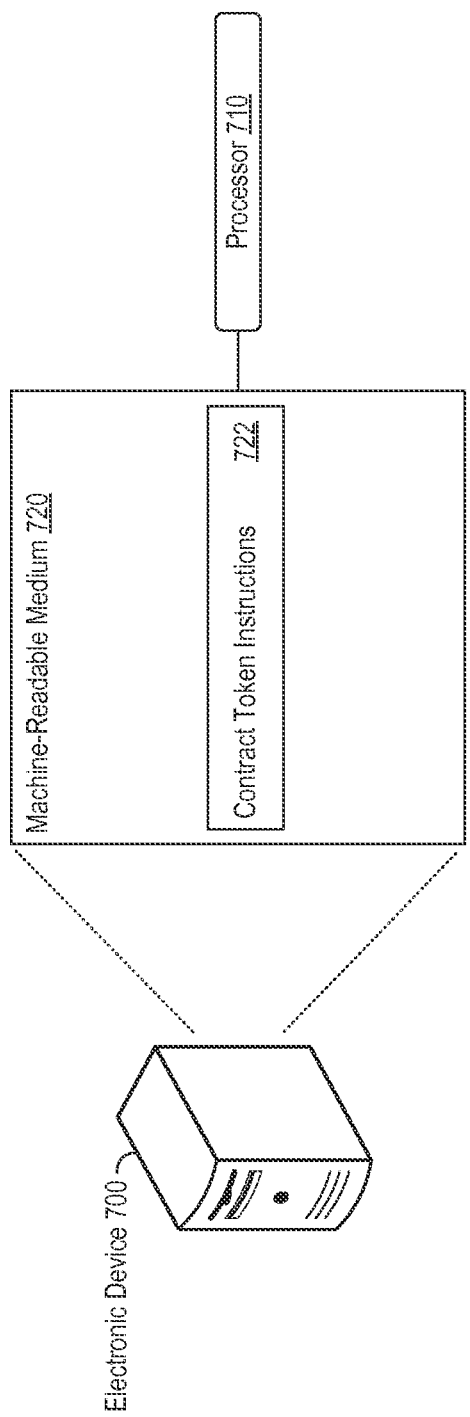
FIG. 7 shows an example of an electronic device that supports exchange of contract tokens including sensor data.

FIG. 7 shows an example of an electronic device 700 that supports exchange of contract tokens including sensor data. The electronic device 700 may be any electronic device, such as a computing system shown in FIG. 7, a mobile phone, a tablet device, or any other electronic device. The electronic device 700 may include a processor 710. The processor 710 may include a central processing unit (CPU), microprocessor, and/or any hardware device suitable for executing instructions stored on a machine-readable medium.

The electronic device 700 may include a machine-readable medium 720. The machine-readable medium 720 may be any non-transitory electronic, magnetic, optical, or other physical storage device that stores executable instructions, such as the contract token instructions 722 shown in FIG. 7. Thus, the machine-readable medium 720 may be, for example, Random Access Memory (RAM), an Electrically-Erasable Programmable Read-Only Memory (EEPROM), a storage drive, an optical disk, and the like.

The electronic device 700 may execute instructions stored on the machine-readable medium 720 through the processor 710. Executing the instructions may cause the processor 710 to perform or support any combination of the features described herein, including any features of the token circuitry described above. To illustrate, executing the contract token instructions 722 may cause the processor 710 to obtain an offer term for a contract through a user interface of the electronic device 700 and capture sensor data through sensor circuitry of the electronic device 700. In some examples, the contract token instructions 722 cause the processor 710 to obtain a non-financial offer term as the offer term. Executing the contract token instructions 722 may further cause the processor 710 to send the offer term and the sensor data to a token authority for generating, by the token authority, a contract offer token that includes the offer term and the sensor data and for sending, by the token authority, the contract offer token that includes the sensor data to a different electronic device.

In some examples, executing the contract token instructions 722 causes the processor 710 to capture the sensor data by capturing GPS data through a GPS sensor circuitry of the electronic device 700 and send the sensor data by sending the GPS data to the token authority for generating a contract offer token that includes the GPS data. In other examples, executing the contract token instructions 722 causes the processor 710 to capture the sensor data by capturing a user image through a camera of the electronic device 700 and send the sensor data by sending the user image to the token authority for generating a contract offer token that includes the user image. The contract token instructions 722 may support generation of non-financial tokens, e.g., tokens without financial terms. Thus, executing the contract token instructions 722 may cause the processor 710 to send the offer term and the sensor data to a token authority for generating, by the token authority, a contract offer token without a financial offer term.

The methods, devices, systems, and logic described above, including the token circuitry, may be implemented in many different ways in many different combinations of hardware, executable instructions stored on a machine-readable medium, or both. For example, token circuitry may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above.

The processing capability of the systems, devices, and circuitry described herein, including the token circuitry, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

While various examples have been described above, many more implementations are possible.

The invention claimed is:

1. A method comprising:
   obtaining, through a user interface of an electronic device, an offer term for a contract;
   accessing sensor data through sensor circuitry of the electronic device, wherein the sensor data includes location data associated with the electronic device from first circuitry of the sensor circuitry and environment data associated with the electronic device from second circuitry of the sensor circuitry;
   generating a contract offer token that specifies the offer term and includes the sensor data with (a) the location data, from the first circuitry, corresponding to a location of the electronic device at which the contract offer token is generated, and (b) the environment data associated with the electronic device from second circuitry of the sensor circuitry;
   sending the contract offer token to a token authentication device for validation based on at least a combination of the environmental data accessed from the second circuitry and the location data from the first circuitry;
   receiving, in response to the sending, verification of the contract offer token;
   sending the verified contract offer token that includes the sensor data to a different electronic device;
   receiving a contract acceptance token from the different electronic device, the contract acceptance token being different from the contract offer token and including an acceptance indication for the offer term specified in the contract offer token;
   pairing the contract offer token with the contract acceptance token to form a contract token pair, wherein the contract token pair is stored in an entry of at least one of a common table and a pairing table mapping correlated tokens; and
   securing the contract token pair to prevent tampering.

2. The method of claim 1, wherein:
   accessing the environment data comprises accessing a digital image depicting surroundings of the electronic device captured through a camera of the electronic device; and
   generating the contract offer token comprises generating the contract offer token to include the digital image.

3. The method of claim 1, wherein:
   accessing the sensor data comprises accessing location atmospheric pressure data captured through a location barometer sensor circuitry of the electronic device; and
   generating the contract offer token comprises generating the contract offer token to include the location atmospheric pressure data.

4. The method of claim 1, wherein the contract offer token and the contract acceptance token differ by having differing global unique identifier values.

5. The method of claim 1, wherein the contract acceptance token further includes sensor data captured by the different electronic device.

6. The method of claim 1, wherein:
   accessing the environment data comprises accessing a digital image depicting surroundings of the electronic device captured through a camera of the electronic device; and
   verifying the contract offer token comprises verifying the location data using the accessed digital image depicting the surroundings of the electronic device.

7. A non-transitory machine-readable medium storing executable instructions that, when executed by a processor, cause the processor to perform operations comprising:
   obtaining, through a user interface of an electronic device, an offer term for a contract;
   accessing sensor data through sensor circuitry of the electronic device, wherein the sensor data includes at least location data associated with the electronic device from first circuitry of the sensor circuitry and environment data associated with the electronic device from second circuitry of the sensor circuitry;

generating a contract offer token that specifies the offer term and includes the sensor data with (a) the location data, from the first circuitry, corresponding to a location of the electronic device at which the contract offer token is generated, and (b) the environment data associated with the electronic device from second circuitry of the sensor circuitry;

sending the contract offer token to a token authentication device for validation based on at least a combination of the environmental data accessed from the second circuitry and the location data from the first circuitry;

receiving, in response to the sending, verification of the contract offer token;

sending the verified contract offer token that includes the sensor data to a different electronic device;

receiving a contract acceptance token from the different electronic device, the contract acceptance token being different from the contract offer token and including an acceptance indication for the offer term specified in the contract offer token;

pairing the contract offer token with the contract acceptance token to form a contract token pair, wherein the contract token pair is stored in an entry of at least one of a common table and a pairing table mapping correlated tokens; and securing the contract token pair to prevent tampering.

8. The non-transitory machine-readable medium of claim 7, wherein the instructions further cause the processor to perform operations comprising:

accessing the environment data comprises accessing a digital image depicting surroundings of the electronic device captured through a camera of the electronic device; and generating the contract offer token comprises generating the contract offer token to include the digital image.

9. The non-transitory machine-readable medium of claim 7, wherein the instructions further cause the processor to perform operations comprising:

accessing the sensor data comprises accessing location atmospheric pressure data captured through a location barometer sensor circuitry of the electronic device; and generating the contract offer token comprises generating the contract offer token to include the location atmospheric pressure data.

10. The non-transitory machine-readable medium of claim 7, wherein the contract offer token and the contract acceptance token differ by having differing global unique identifier values.

11. The non-transitory machine-readable medium of claim 7, wherein the contract acceptance token further includes sensor data captured by the different electronic device.

12. The non-transitory machine-readable medium of claim 7, wherein the instructions further cause the processor to perform operations comprising:

accessing the environment data comprises accessing a digital image depicting surroundings of the electronic device captured through a camera of the electronic device; and verifying the contract offer token comprises verifying the location data using the accessed digital image depicting the surroundings of the electronic device.

13. A system comprising:
a processor; and
a non-transitory machine-readable medium storing executable instructions that, when executed by the processor, cause the processor to perform operations comprising:

obtaining, through a user interface of an electronic device, an offer term for a contract;

accessing sensor data through sensor circuitry of the electronic device, wherein the sensor data includes location data associated with the electronic device from first circuitry of the sensor circuitry and environment data associated with the electronic device from second circuitry of the sensor circuitry;

generating a contract offer token that specifies the offer term and includes the sensor data with (a) the location data, from the first circuitry, corresponding to a location of the electronic device at which the contract offer token is generated, and (b) the environment data associated with the electronic device from second circuitry of the sensor circuitry;

sending the contract offer token to a token authentication device for validation based on at least a combination of the environmental data accessed from the second circuitry and the location data from the first circuitry;

receiving, in response to the sending, verification of the contract offer token;

sending the verified contract offer token that includes the sensor data to a different electronic device;

receiving a contract acceptance token from the different electronic device, the contract acceptance token being different from the contract offer token and including an acceptance indication for the offer term specified in the contract offer token;

pairing the contract offer token with the contract acceptance token to form a contract token pair, wherein the contract token pair is stored in an entry of at least one of a common table and a pairing table mapping correlated tokens; and securing the contract token pair to prevent tampering.

14. The system of claim 13, wherein the instructions further cause the processor to perform operations comprising:

accessing the environment data comprises accessing a digital image depicting surroundings of the electronic device captured through a camera of the electronic device; and generating the contract offer token comprises generating the contract offer token to include the digital image.

15. The system of claim 13, wherein the instructions further cause the processor to perform operations comprising:

accessing the sensor data comprises accessing location atmospheric pressure data captured through a location barometer sensor circuitry of the electronic device; and generating the contract offer token comprises generating the contract offer token to include the location atmospheric pressure data.

16. The system of claim 13, wherein the contract offer token and the contract acceptance token differ by having differing global unique identifier values.

17. The system of claim 13, wherein the contract acceptance token further includes sensor data captured by the different electronic device.

18. The system of claim 17, wherein the instructions further cause the processor to perform operation comprising:

verifying authenticity of the contract acceptance token based on at least the included sensor data captured by the different electronic device.

19. The system of claim 13, wherein the contract offer token further includes a token element indicating an offer validity period after which an offer specified in the contract offer token expires.

20. The system of claim 13, wherein the instructions further cause the processor to perform operations comprising:
  accessing the environment data comprises accessing a digital image depicting surroundings of the electronic device captured through a camera of the electronic device; and
  verifying the contract offer token comprises verifying the location data using the accessed digital image depicting the surroundings of the electronic device.

* * * * *